C. Ostrander,
Fruit Gatherer.
No. 112,622. Patented Mar. 14, 1871.
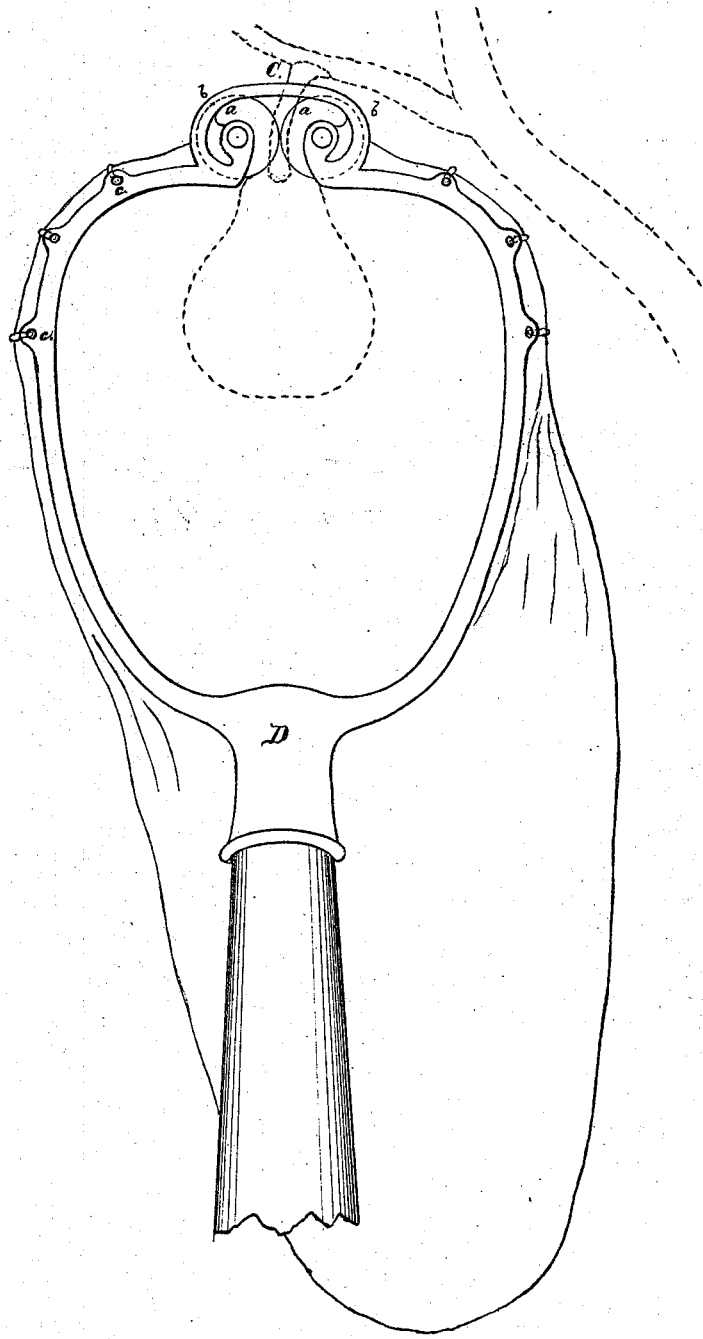
Witnesses
Daniel W. Guernsey
John L. Ditrow
Inventor
Cornelius Ostrander

UNITED STATES PATENT OFFICE.

CORNELIUS OSTRANDER, OF POUGHKEEPSIE, NEW YORK, ASSIGNOR OF ONE-HALF HIS RIGHT TO ALSON OSTRANDER, OF SAME PLACE.

IMPROVEMENT IN FRUIT-GATHERERS.

Specification forming part of Letters Patent No. 112,622, dated March 14, 1871.

I, CORNELIUS OSTRANDER, of Poughkeepsie, in the county of Dutchess and State of New York, have invented certain Improvements in Fruit-Gatherers, of which the following is a specification:

The nature of my invention is the combination of a frame and rotary cutters, the object being to gather fruit of any kind by cutting the stem of the one to be picked without injuring the fruit or shaking off any others that might be hanging on the same limb. When picked the fruit is caught in a bag or hose attached to the frame.

In order more fully to describe my invention, I will refer to the accompanying drawing.

D is the frame of the picker, provided with a suitable socket for a pole or handle. On the outside of the frame are eyes, by means of which the bag may be attached to the frame in such a manner as not to interfere with the stem of the fruit being drawn into the cutters $a\ a$. The upper part of the frame is so constructed as to form recesses or grooves $b\ b$ for the reception of the cutters, at the same time forming shields which protect them, and also prevent their injuring the fruit or limbs.

The cutters are made of steel brought up to a sharp edge, so that when the stem of the fruit is drawn between them it will be cut with a slight pull.

I claim as my invention—

The combination of the rotary cutters $a\ a$ and the frame D, substantially as and for the purpose hereinbefore set forth.

CORNELIUS OSTRANDER.

Witnesses:
 DANIEL W. GUERNSEY,
 JOHN L. DISBROW.